United States Patent
Schulz et al.

(10) Patent No.: US 7,679,310 B2
(45) Date of Patent: Mar. 16, 2010

(54) METHOD AND SYSTEM FOR CONTROLLING PULSE WIDTH MODULATION IN A POWER INVERTER IN ELECTRIC DRIVES

(75) Inventors: Steven E. Schulz, Torrance, CA (US); Brian A. Welchko, Torrance, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 321 days.

(21) Appl. No.: 11/923,293

(22) Filed: Oct. 24, 2007

(65) Prior Publication Data

US 2009/0108798 A1 Apr. 30, 2009

(51) Int. Cl.
*H02P 23/00* (2006.01)
(52) U.S. Cl. .................. 318/811; 318/799; 318/801
(58) Field of Classification Search .............. 318/599, 318/811, 798, 799, 800, 801
See application file for complete search history.

(56) References Cited

U.S. PATENT DOCUMENTS 6,023,417 A * 2/2000 Hava et al. .................. 363/41
6,075,350 A * 6/2000 Peng ......................... 323/207
6,424,113 B1 * 7/2002 Kelly et al. ................. 318/599
6,534,949 B2 * 3/2003 Szczesny et al. ............ 318/801

OTHER PUBLICATIONS

Hava, A. M., et al. "Simple Analytical and Graphical Methods for Carrier-Based PWM-VSI Drives," IEEE Transactions on Power Electronics, 1999, pp. 49-61, vol. 14, No. 1.

* cited by examiner

*Primary Examiner*—Rina I Duda
(74) *Attorney, Agent, or Firm*—Ingrassia Fisher & Lorenz, P.C.

(57) ABSTRACT

Methods and systems for controlling a power inverter in an electric drive system of an automobile are provided. The various embodiments control the power inverter by, responsive to either a commanded torque of the electric motor being above a first torque level, or a commanded speed of the electric motor being above a first speed level, controlling the power inverter with a discontinuous pulse width modulated (DPWM) signal to generate a modulated voltage waveform for driving the electric motor. Additionally, the embodiments control the power inverter by, responsive to both a commanded torque of the electric motor being below the first torque level, and a commanded speed of the electric motor being below the first speed level, controlling the power inverter with a continuous pulse width modulated (CPWM) signal to generate the modulated voltage waveform for driving the electric motor.

19 Claims, 4 Drawing Sheets

METHOD AND SYSTEM FOR CONTROLLING PULSE WIDTH MODULATION IN A POWER INVERTER IN ELECTRIC DRIVES

TECHNICAL FIELD

The present invention generally relates to power inverters, and more particularly relates to methods and systems for controlling power inverters in electric drive systems.

BACKGROUND OF THE INVENTION

In recent years, advances in technology, as well as ever evolving tastes in style, have led to substantial changes in the design of automobiles. One of the changes involves the complexity of the electrical systems within automobiles, particularly alternative fuel vehicles, such as hybrid, electric, and fuel cell vehicles. Such alternative fuel vehicles typically use an electric motor, perhaps in combination with another actuator, to drive the wheels.

These types of vehicles can offer significant improvements in efficiency. There remains, however, an ever present need to improve efficiency of electric motor drives to reduce power losses, improve battery life, increasing range and mileage. Additionally, there remains a need to maintain effective motor control with low current distortions and torque ripple.

Accordingly, it is desirable to provide a control method that reduces power losses and increases the efficiency of electric motor drives in automobiles, while providing effective motor control with low current distortion and torque ripple. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, a method for controlling a power inverter in an electric drive system of an automobile is provided. In general, the method controls the power inverter by, responsive to either a commanded torque of the electric motor being above a first torque level, or a commanded speed of the electric motor being above a first speed level, controlling the power inverter with a discontinuous pulse width modulated (DPWM) signal to generate a modulated voltage waveform for driving the electric motor. Additionally, the method controls the power inverter by, responsive to both a commanded torque of the electric motor being below the first torque level, and a commanded speed of the electric motor being below the first speed level, controlling the power inverter with a continuous pulse width modulated (CPWM) signal to generate the modulated voltage waveform for driving the electric motor. The method reduces inverter losses and increases the efficiency of the drive system by using DPWM at high speeds or high torque, while providing low current distortion and torque ripple by using CPWM at low speeds and low torque. Thus, the method both reduces power loss while providing good system performance.

In a further embodiment, an automotive electric drive system is provided. The automotive electric drive system includes an electric motor, a power inverter coupled to the motor, and at least one processor coupled to the electric motor and the inverter. The at least one processor is configured to, responsive to either a commanded torque of the electric motor being above a first torque level, or a commanded speed of the electric motor being above a first speed level, control the power inverter with a discontinuous pulse width modulated (DPWM) signal to generate a modulated voltage waveform for driving the electric motor. Additionally, the processor is configured to, responsive to both a commanded torque of the electric motor being below the first torque level, and a commanded speed of the electric motor being below the first speed level, control the power inverter with a continuous pulse width modulated (CPWM) signal to generate the modulated voltage waveform for driving the electric motor. The system reduces inverter losses and increases the efficiency of the drive system by using DPWM at high speeds or high torque, while providing low current distortion and torque ripple by using CPWM at low speeds and low torque. Thus, the drive system both reduces power loss while providing good system performance.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1:
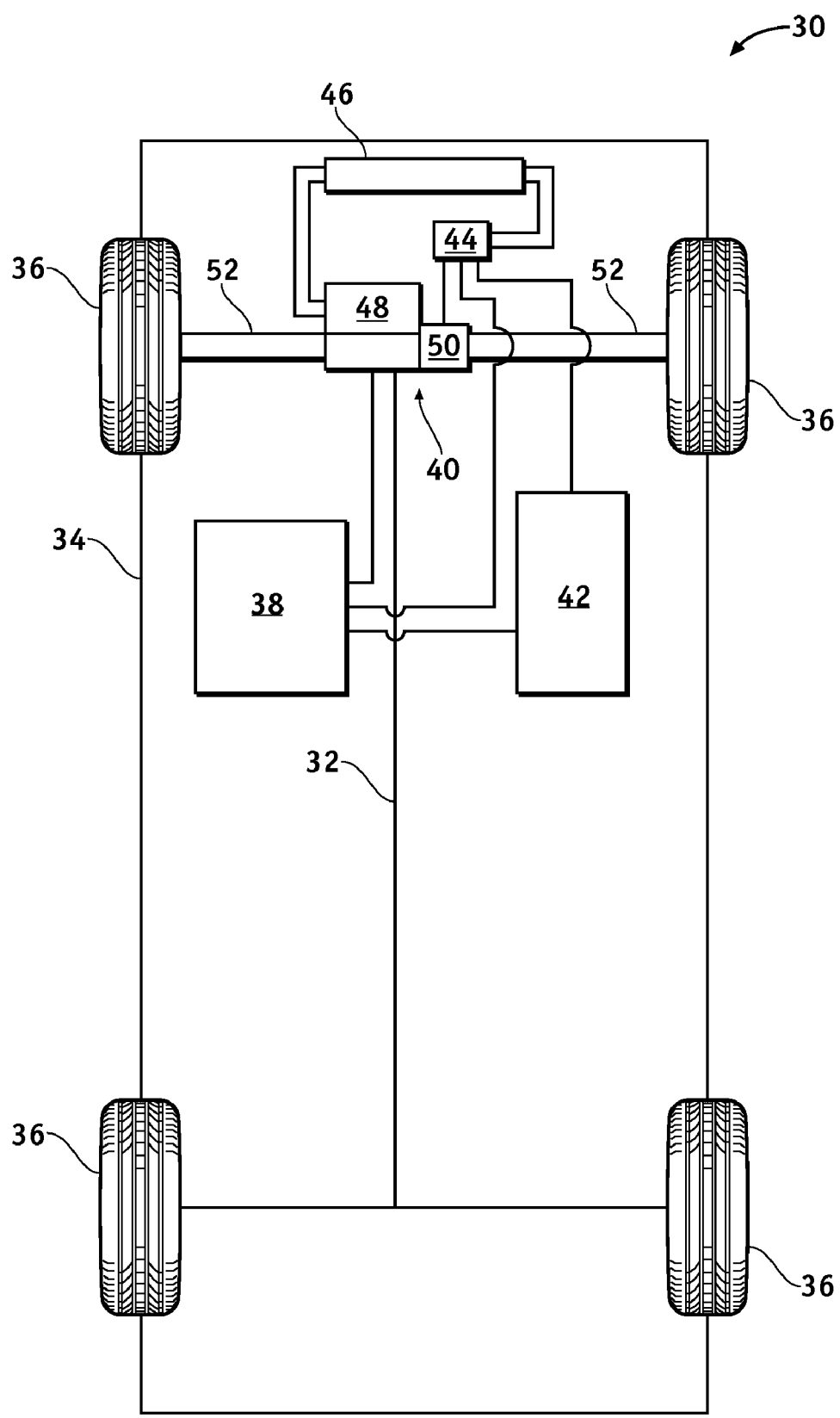
FIG. 1 is a schematic view of an exemplary automobile according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that the figures are merely illustrative and may not be drawn to scale.

The figures illustrate a method and a system for controlling a power inverter in an electric drive system of an automobile. In general, the system and method controls the power inverter by, responsive to either a commanded torque of the electric motor being above a first torque level, or a commanded speed of the electric motor being above a first speed level, controlling the power inverter with a discontinuous pulse width modulated (DPWM) signal to generate a modulated voltage waveform for driving the electric motor. Additionally, the system and method controls the power inverter by, responsive to both a commanded torque of the electric motor being below the first torque level, and a commanded speed of the electric motor being below the first speed level, controlling the power inverter with a continuous pulse width modulated (CPWM) signal to generate the modulated voltage waveform for driving the electric motor.

In general DPWM provides reduced inverter losses and increased efficiency when compared to CPWM. However, at lower current levels the DPWM can increase current distortion, leading to increased torque ripple. At higher speeds, other sources of distortion overshadow the distortion introduced by DPWM. Additionally, the motor current will increase for a given torque due to field weakening. Therefore, the system and method use DPWM at high speeds regardless of the torque level to favor losses provided by DPWM. Additionally, in some embodiments, DPWM is used at zero torque and zero speed to cease inverter switching while the motor is stationary. Thus, the system and method reduce power loss while providing good system performance.

FIG. 1 illustrates a vehicle 30, or "automobile," according to one embodiment of the present invention. The automobile 30 includes a chassis 32, a body 34, four wheels 36, and an electronic control system 38. The body 34 is arranged on the chassis 32 and substantially encloses the other components of the automobile 30. The body 34 and the chassis 32 may jointly form a frame. The wheels 36 are each rotationally coupled to the chassis 32 near a respective corner of the body 34.

The automobile 30 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 30 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine or fuel cell energy source, a combustion/electric motor hybrid engine, and an electric motor.

In the exemplary embodiment illustrated in FIG. 1, the automobile 30 is a hybrid vehicle, and further includes an actuator assembly 40, a battery (or other electrical energy storage) 42, a power inverter (or inverter) 44, and a radiator 46. The actuator assembly 40 includes a combustion engine 48 and an electric motor/generator (or motor) 50. The electric motor 50 is, in one embodiment, a sinusoidally-wound alternating current (AC) motor (e.g., permanent magnet or induction) such as commonly used in automotive vehicles (e.g., traction drive control systems, and the like). As will be appreciated by one skilled in the art, the electric motor 50 includes a transmission therein, and although not illustrated also includes a stator assembly (including conductive coils), a rotor assembly (including a ferromagnetic core), and a cooling fluid (i.e., coolant). The stator assembly and/or the rotor assembly within the electric motor 50 may include multiple (e.g., sixteen) electromagnetic poles, as is commonly understood.

Still referring to FIG. 1, in one embodiment, the combustion engine 48 and the electric motor 50 are integrated such that both are mechanically coupled to at least some of the wheels 36 through one or more drive shafts 52. The radiator 46 is connected to the frame at an outer portion thereof and although not illustrated in detail, includes multiple cooling channels therethough that contain a cooling fluid (i.e., coolant) such as water and/or ethylene glycol (i.e., "antifreeze) and is coupled to the engine 48 and the inverter 44. Referring again to FIG. 1, in the depicted embodiment, the inverter 44 receives and shares coolant with the electric motor 50. The radiator 46 may be similarly connected to the inverter 44 and/or the electric motor 50.

The electronic control system 38 is in operable communication with the actuator assembly 40, the battery 42, and the inverter 44. Although not shown in detail, the electronic control system 38 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

Figure 2:
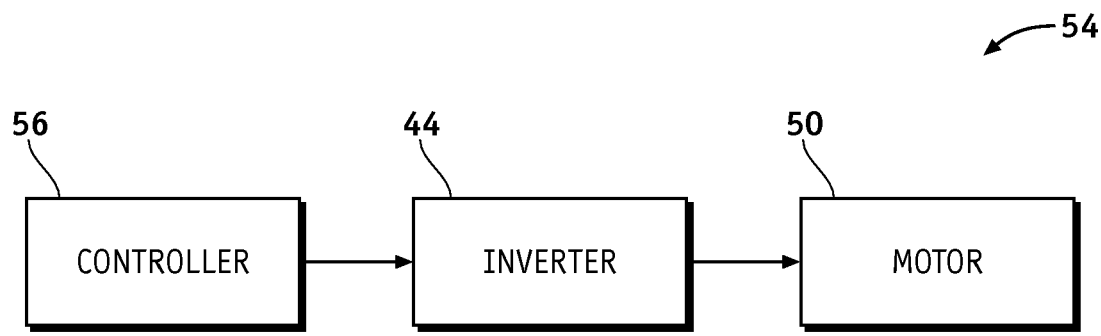
FIG. 2 is a block diagram of a voltage source inverter system within the automobile of FIG. 1.

Referring to FIG. 2, a voltage source inverter system (or electric drive system) 54 is shown in accordance with an exemplary embodiment of the present invention. The voltage source inverter system 54 includes a controller 56, the inverter 44 coupled to an output of the controller 56, the motor 50 coupled to a first output of the inverter 44. The controller 56 may be integral with the electronic control system 38 shown in FIG. 1.

Figure 3:
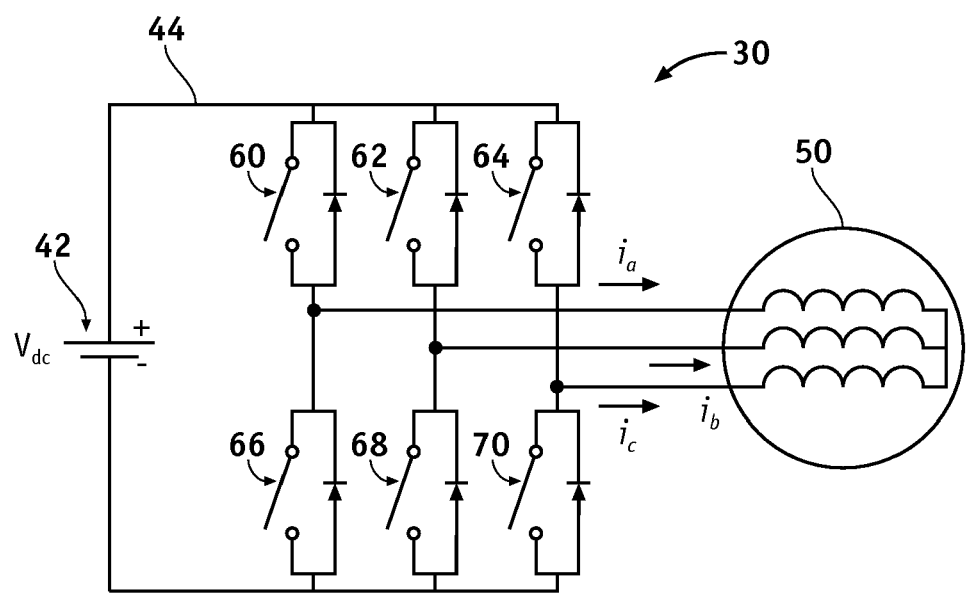
FIG. 3 is a schematic view of an inverter within the automobile of FIG. 1.

FIG. 3 illustrates the inverter 44 of FIGS. 1 and 2 in greater detail. The inverter 44 includes a three-phase circuit coupled to the motor 50. More specifically, the inverter 44 includes a switch network having a first input coupled to a voltage source $V_{dc}$ (e.g., the battery 42) and an output coupled to the motor 50. Although a single voltage source is shown, a distributed direct current (DC) link with two series sources may be used.

The switch network comprises three pairs of series switches with antiparallel diodes (i.e., antiparallel to each switch) corresponding to each of the phases. Each of the pairs of series switches comprises a first switch (or transistor) 60, 62, and 64 having a first terminal coupled to a positive electrode of the voltage source 42 and a second switch 66, 68, and 70 having a second terminal coupled to a negative electrode of the voltage source 42 and having a first terminal coupled to a second terminal of the respective first switch 60, 62, and 64.

Referring to FIGS. 1, 2 and 3 collectively, during operation, the vehicle 30 is operated by providing power to the wheels 36 with the combustion engine 48 and the electric motor 50 in an alternating manner and/or with the combustion engine 48 and the electric motor 50 simultaneously. In order to power the electric motor 50, DC power is provided from the battery 42 to the inverter 44, which converts the DC power into AC power, before the power is sent to the electric motor 50. As will be appreciated by one skilled in the art, the conversion of DC power to AC power is substantially performed by operating (i.e., repeatedly switching) the transistors within the inverter 44.

Generally, the controller 56 produces Pulse Width Modulated (PWM) signals for controlling the switching action of the inverter 44. The inverter 44 then converts the PWM signals to a modulated voltage waveform for operating the motor 50. In a typical application with three-phase AC current motors, three separate PWM signals are generated, one for, each for a respective pair of the switches in the inverter 44.

In a preferred embodiment, the controller 56 controls the inverter 44 with a discontinuous pulse width modulated (DPWM) signal when either a commanded torque of the electric motor is above a first torque level, or a commanded speed of the electric motor is above a first speed level. Likewise, the controller 56 controls the inverter 44 with a continuous pulse width modulated (CPWM) signal when both a commanded torque of the electric motor is below the first torque level and a commanded speed of the electric motor is below the first speed level.

This configuration of the drive system ensures good control and efficient use of power in the electric motor drive system. Specifically, the use of DPWM at high speeds and torques reduces power losses that occur at those speeds and torques. Conversely, the use of CPWM at low speeds and low currents provide low current distortion and torque ripple. The controller 56 can thus provide high efficiency while also providing good system performance.

A variety of different types of DPWM and CPWM techniques can be used in the various embodiments. In general, CPWM is defined as those types of pulse width modulation techniques where each leg of the inverter is switching continuously over the full 360 degree cycle of the modulated voltage waveform. Examples of suitable CPWM techniques include sine PWM, third harmonic injection PWM, and classical space vector PWM. Again, these are just examples, and other types of CPWM techniques can also be used.

Likewise, DPWM is defined as those types of pulse width modulation techniques where each phase leg of the inverter is not switched over the full 360 degree cycle of the modulated waveform. For example, each phase leg of the inverter can not be switched for four 30 degree, two 60 degree, or one 120 degree segments of the 360 degree cycle of the modulated voltage waveform. Examples of suitable DPWM techniques include generalized DPWM (GDPWM), DPWM0, DPWM1, DPWM2, DPWM3, DPWMMIN, and DPWMMAX. Again, these are just examples of the type of DPWM techniques that can be used.

Figure 4:
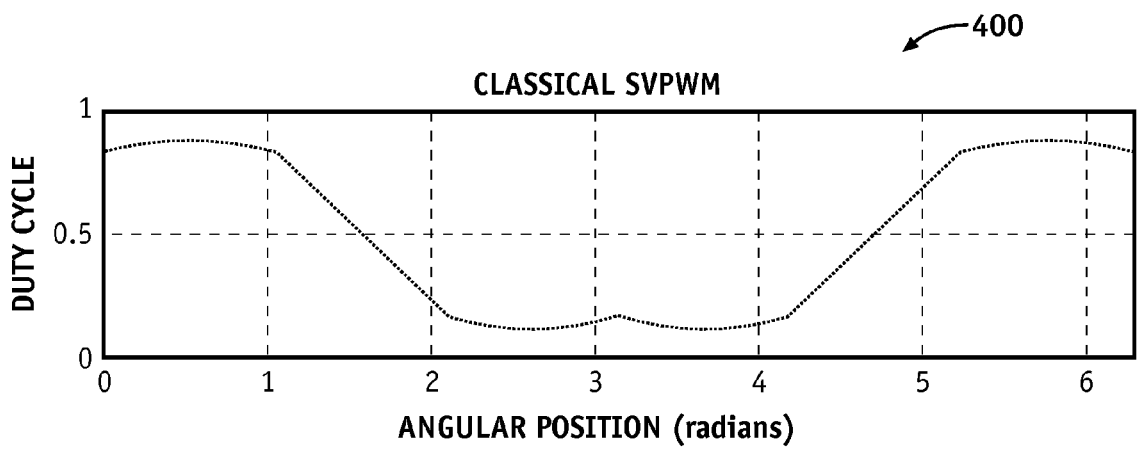
FIG. 4 is a graphical representation of an exemplary waveform of a typical CPWM duty cycle command plotted over one fundamental electrical period of an electric motor.

Turning now to FIG. 4, FIG. 4 shows an exemplary waveform of a typical CPWM duty cycle command plotted over one fundamental electrical period of an electric motor. In this example, a classical space vector PWM technique is being utilized. In this illustrated example, the duty cycle of command is greater than zero and less than unity over the entire fundamental electrical period of the motor. Because the duty cycle is always greater than zero and less than unity, the corresponding inverter switches are constantly switched during operation of the motor.

Figure 5:
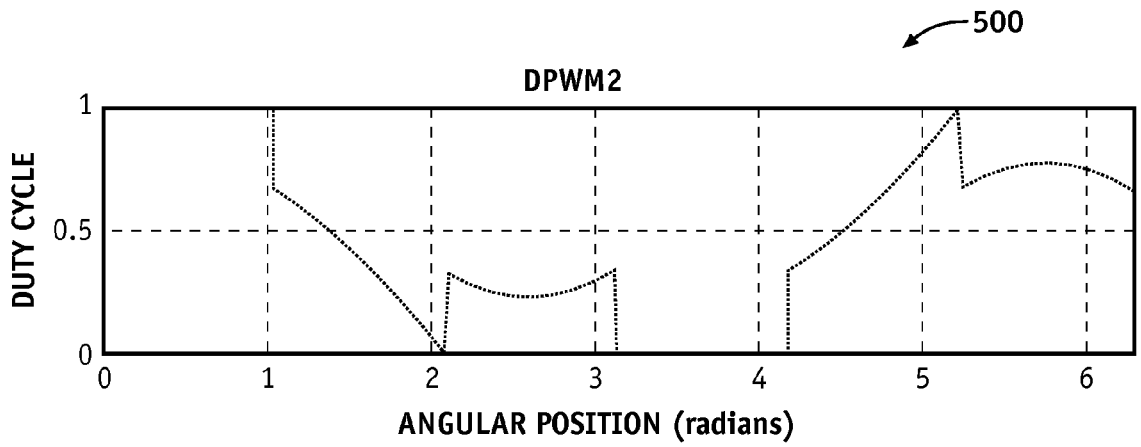
FIG. 5 is a graphical representation of an exemplary waveform of an exemplary waveform of a typical DPWM duty cycle command plotted over one fundamental electrical period of an electric motor.

Turning now to FIG. 5, FIG. 5 shows an exemplary waveform of a typical DPWM duty cycle command plotted over one fundamental electrical period of an electric motor. In this example, a DPWM2 technique is being utilized. In the illustrated DWPM duty cycle command technique the duty cycle is clamped to either zero or one for two 60 degree (approximately 1 radian) segments of the fundamental electrical period. During these clamped periods, the respective inverter switches will not be switched. Hence, during these clamped periods no switching losses will occur in the corresponding phase leg, only conduction losses. Thus, the use of DPWM technique can reduce switching losses to as much as half the level that would occur using CPWM.

While DPWM provides enhanced switching loss characteristics, it does have some performance drawbacks. Typically, at low modulation indexes (e.g., less than 0.6) the DPWM methods can induce higher voltage distortion, and in turn higher current distortion than CPWM methods. This is also the case at low current levels. The increased current distortion can lead to unwanted torque ripple from the drive.

Accordingly, a trade-off exists between distortion at low modulation index and low currents versus inverter switching losses. The embodiments provide a system and method that selects either CPWM or DPWM depending on the operating conditions of the drive. Specifically, the embodiments utilize CPWM methods at low modulation indexes or low current levels where higher current distortions would otherwise occur.

Figure 6:
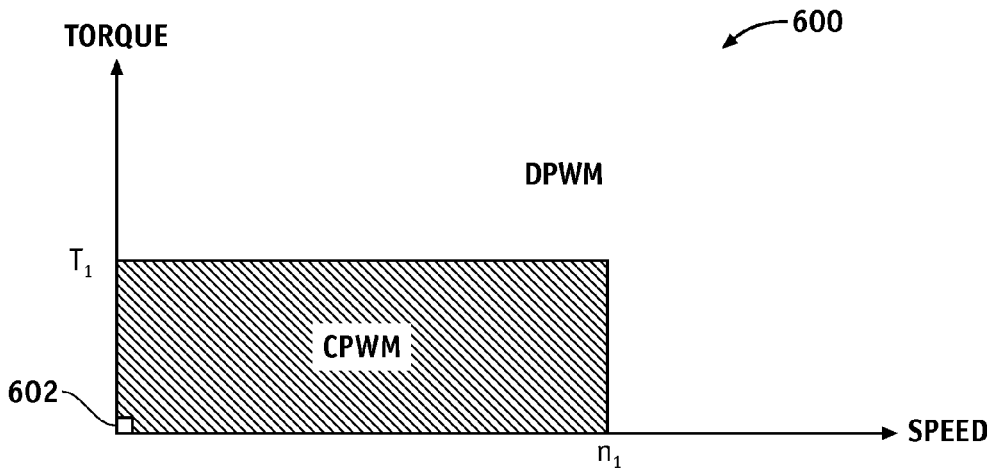
FIG. 6 is a graphical representation of an exemplary inverter control technique.

Turning now to FIG. 6, a graphical representation of a modulation control technique is illustrated. In this illustrated technique, at low torques of less than $T_1$, CPWM is selected to reduce distortion. Above torques of $T_1$, DPWM is selected to improve efficiency. The value of $T_1$ can be selected based on application requirements, but may be in the range of 10-15% of the maximum motor torque. This will provide better current fidelity when the torque command is relatively low, and switching losses are very small, and yet provide maximum efficiency due to reduced switching losses when the torque command is high.

Additionally, DPWM is selected regardless of torque level when motor speed is increased beyond the threshold $n_1$. Modulation index typically increases with speed (e.g., in cases with constant flux), and DPWM has lower distortion than CPWM at high modulation indexes. Furthermore, above a base speed motor drives typically employ field weakening. For certain types of motors (e.g., permanent magnet motors) additional stator current is required to counteract the flux due to the permanent magnets. This current is required even if there is zero torque command. For all these reasons, at speeds above $n_1$, DPWM is selected regardless of torque.

Furthermore, in some embodiments DPWM is also utilized at near zero speed, zero torque conditions. In FIG. 6, the region 602 illustrates exemplary conditions near zero motor speed and near zero torque where DWPM can be utilized. In this region using DPWM can allow the inverter to cease switching at some phases. This occurs due to the minimum pulse width capability of the inverter. At low modulation indexes, the DPWM duty cycle waveforms are compressed toward either zero or one. If the inverter cannot reproduce these small (or large) duty cycles, they are effectively dropped, thus reducing the switching losses even further. Typically, the near zero speed zero torque region would extend to approximately 1% of the rated torque and speed.

Figure 7:
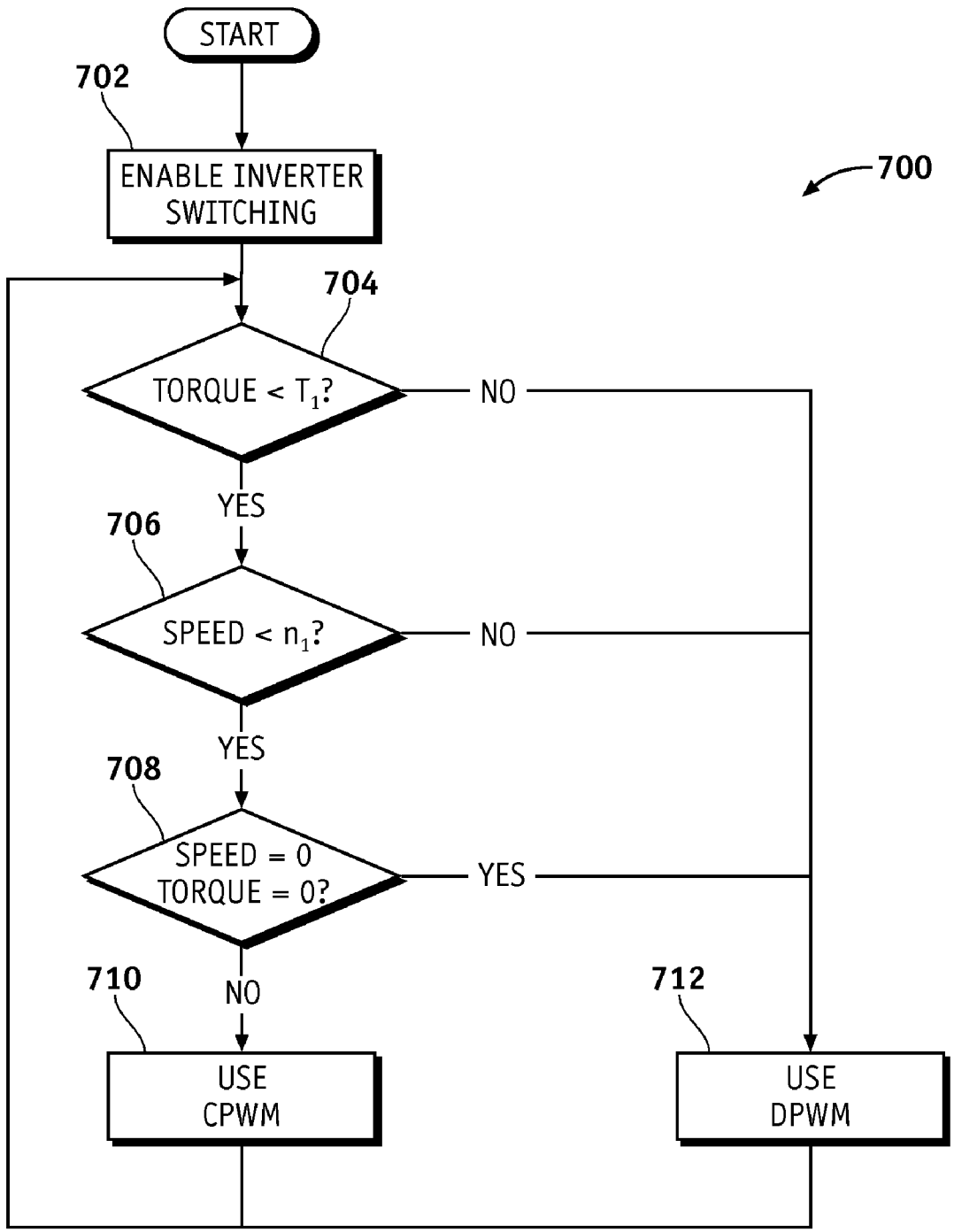
FIG. 7 is a flow diagram illustrated an exemplary inverter modulation control method.

Turning now to FIG. 7, a flow diagram illustrated an exemplary inverter modulation control method is illustrated. In this method, the torque and speed are checked in order to determine whether to apply CPWM or DPWM. In step 702, the switching of the inverter is enabled. In step 704, the commanded torque is compared to a first torque level, $T_1$. If torque is greater than $T_1$, the method transitions to step 712 and DPWM is utilized. If torque is less than $T_1$, the method transitions to step 706.

In step 706, the commanded speed is compared to a first speed level, $n_1$. If the speed is greater than $n_1$, the method again transitions to step 712 and DPWM is utilized. If speed is less than $n_1$, the method transitions to step 708. At step 708, the speed and torque are compared to zero. If the speed and torque are both near zero, the method again transitions to step 712 and DPWM is utilized. If the either the speed or the torque is not near zero, the method transitions to step 710 and CPWM is utilized. The method then returns to step 704. This process is repeated as long as inverter switching occurs, with the method causing modulation to change between CPWM and DPWM techniques as torque and speed conditions change.

Thus, the selection of a PWM strategy is dependent on the operating conditions of motor drive (i.e., torque and speed). This provides a balance between low distortion and torque ripple, as well as high efficiency.

In addition to speed and torque, it should be noted that additional parameters could also be used to determine whether CPWM or DPWM techniques are used. Examples of parameters that could be used include coolant temperature, voltage, modulation index and current level in the inverters. This would provide additional ability to optimize the performance and efficiency of the drive system.

Thus, the embodiments of the invention provide a system and method that controls the power inverter by, responsive to either a commanded torque of the electric motor being above a first torque level, or a commanded speed of the electric motor being above a first speed level, controlling the power inverter with a discontinuous pulse width modulated (DPWM) signal to generate a modulated voltage waveform for driving the electric motor. Additionally, the system and method controls the power inverter by, responsive to both a commanded torque of the electric motor being below the first torque level, and a commanded speed of the electric motor being below the first speed level, controlling the power inverter with a continuous pulse width modulated (CPWM) signal to generate the modulated voltage waveform for driving the electric motor. Thus, the system and method reduce power loss while providing good system performance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling a power inverter coupled to an electric motor in an electric drive system of an automobile, the method comprising:
controlling the power inverter with a discontinuous pulse width modulated (DPWM) signal to generate a modulated voltage waveform for driving the electric motor, responsive to either a commanded torque of the electric motor being above a first torque level, or a commanded speed of the electric motor being above a first speed level; and
controlling the power inverter with a continuous pulse width modulated (CPWM) signal to generate the modulated voltage waveform for driving the electric motor, responsive to both a commanded torque of the electric motor being below the first torque level, and a commanded speed of the electric motor being below the first speed level.

2. The method of claim 1, further comprising:
controlling the power inverter with the DPWM signal to generate the modulated voltage waveform for driving the electric motor, responsive to both a commanded torque of the electric motor being substantially zero, and a commanded speed of the electric motor being substantially zero.

3. The method of claim 2, wherein the commanded torque of the electric motor being substantially zero comprises a commanded torque of less than 1% of rated torque for the electric motor.

4. The method of claim 2, wherein the commanded speed of the electric motor being substantially zero comprises a commanded speed of less than 1% of rated speed for the electric motor.

5. The method of claim 1, wherein the DPWM signal comprises a signal modulated using a technique selected from a group consisting of GDPWM, DPWMMIN, DPWMMAX, DPWM0, DPWM1, DPWM2, and DPWM3.

6. The method of claim 1, wherein the DPWM signal comprises a signal modulated using a DPWM2 technique.

7. The method of claim 1, wherein the CPWM signal comprises a signal modulated using a technique selected from a group consisting of third harmonic injection PWM, classic space vector PWM and sine PWM.

8. The method of claim 1, wherein the CPWM signal comprises a signal modulated using a classic space vector PWM technique.

9. The method of claim 1, wherein the electric motor comprises a sinusoidally-wound alternating current (AC) motor.

10. The automotive electric drive system of claim 1, wherein the commanded speed of the electric motor being substantially zero comprises a commanded speed of less than 1% of rated speed for the electric motor.

11. A method for controlling a power inverter coupled to an electric motor in an electric drive system of an automobile, where the electric motor comprises a sinusoidally-wound alternating current (AC) motor, the method comprising:
responsive to either a commanded torque of the electric motor being above a first torque level, or a commanded speed of the electric motor being above a first speed level, controlling the power inverter with a discontinuous pulse width modulated (DPWM) signal to generate a modulated voltage waveform for driving the electric motor;
responsive to both a commanded torque of the electric motor being below the first torque level but not substantially zero, and a commanded speed of the electric motor being below the first speed level but not substantially zero, controlling the power inverter with a continuous pulse width modulated (CPWM) signal to generate the modulated voltage waveform for driving the electric motor; and
responsive to both a commanded torque of the electric motor being less than 1% of rated torque for the electric motor, and a commanded speed of the electric motor being less than 1% of rated speed for the electric motor, controlling the power inverter with the DPWM signal to generate the modulated voltage waveform for driving the electric motor.

12. An automotive electric drive system comprising:
an electric motor;
a power inverter coupled to the electric motor; and
at least one processor coupled to the electric motor and the inverter, the at least one processor being configured to:
responsive to either a commanded torque of the electric motor being above a first torque level, or a commanded speed of the electric motor being above a first speed level, controlling the power inverter with a discontinuous pulse width modulated (DPWM) signal to generate a modulated voltage waveform for driving the electric motor; and responsive to both a commanded torque of the electric motor being below the first torque level, and a commanded speed of the electric motor being below the first speed level, controlling the power inverter with a continuous pulse width modulated (CPWM) signal to generate the modulated voltage waveform for driving the electric motor.

13. The automotive electric drive system of claim 12, wherein the at least one processor is further configured to:

responsive to both a commanded torque of the electric motor being substantially zero, and a commanded speed of the electric motor being substantially zero, controlling the power inverter with the DPWM signal to generate the modulated voltage waveform for driving the electric motor.

14. The automotive electric drive system of claim 13, wherein the commanded torque of the electric motor being substantially zero comprises a commanded torque of less than 1% of rated torque for the electric motor.

15. The automotive electric drive system of claim 12, wherein the DPWM signal comprises a signal modulated using a technique selected from a group consisting of GDPWM, DPWMMIN, DPWMMAX, DPWM0, DPWM1, DPWM2, and DPWM3.

16. The automotive electric drive system of claim 12, wherein the DPWM signal comprises a signal modulated using a DPWM1 technique.

17. The automotive electric drive system of claim 12, wherein the CPWM signal comprises a signal modulated using a technique selected from a group consisting of third harmonic injection PWM, classic space vector PWM and sine PWM.

18. The automotive electric drive system of claim 12, wherein the CPWM signal comprises a signal modulated using a classic space vector PWM technique.

19. The automotive electric drive system of claim 12, wherein the electric motor comprises a sinusoidally-wound alternating current (AC) motor.

* * * * *